Jan. 29, 1952          A. R. LINDSAY          2,583,781
STATION WAGON OR THE LIKE
Filed Feb. 18, 1946          8 Sheets-Sheet 1

*INVENTOR*
Alexander R. Lindsay
BY
*ATTORNEY*

Jan. 29, 1952  A. R. LINDSAY  2,583,781
STATION WAGON OR THE LIKE
Filed Feb. 18, 1946  8 Sheets-Sheet 2
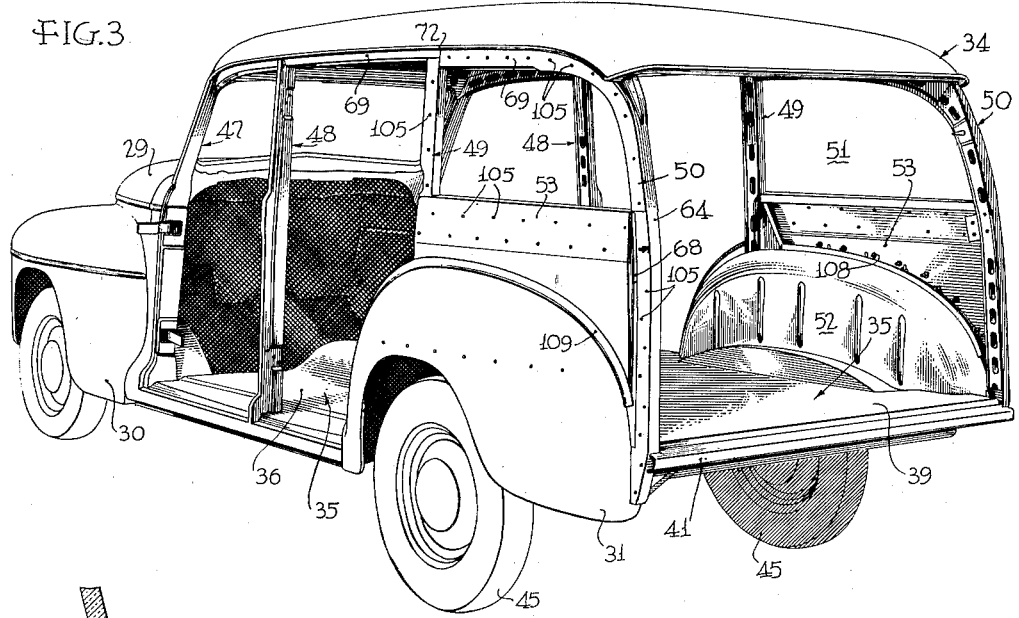
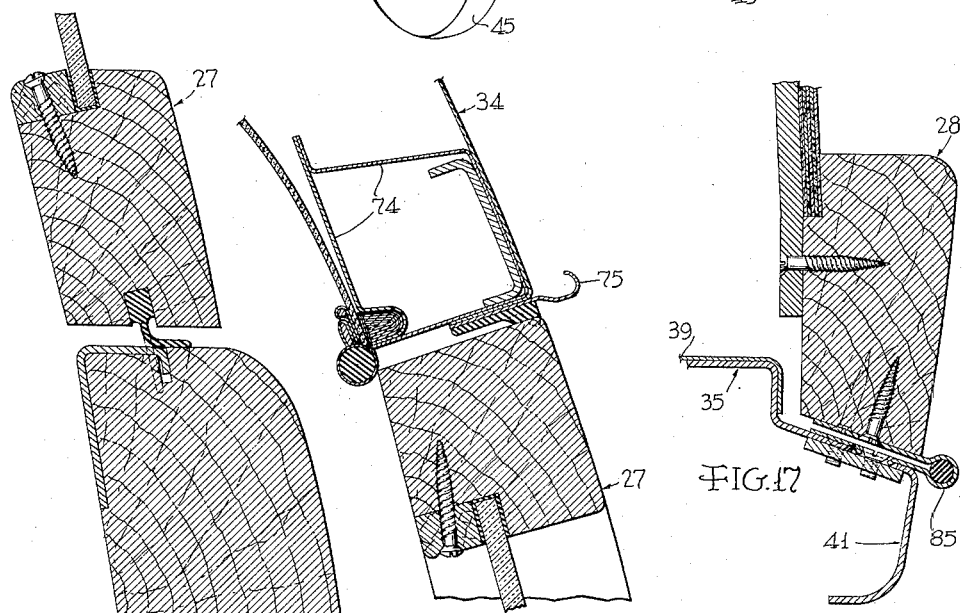
INVENTOR
Alexander R. Lindsay
BY 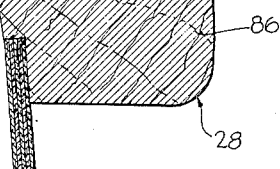
ATTORNEY

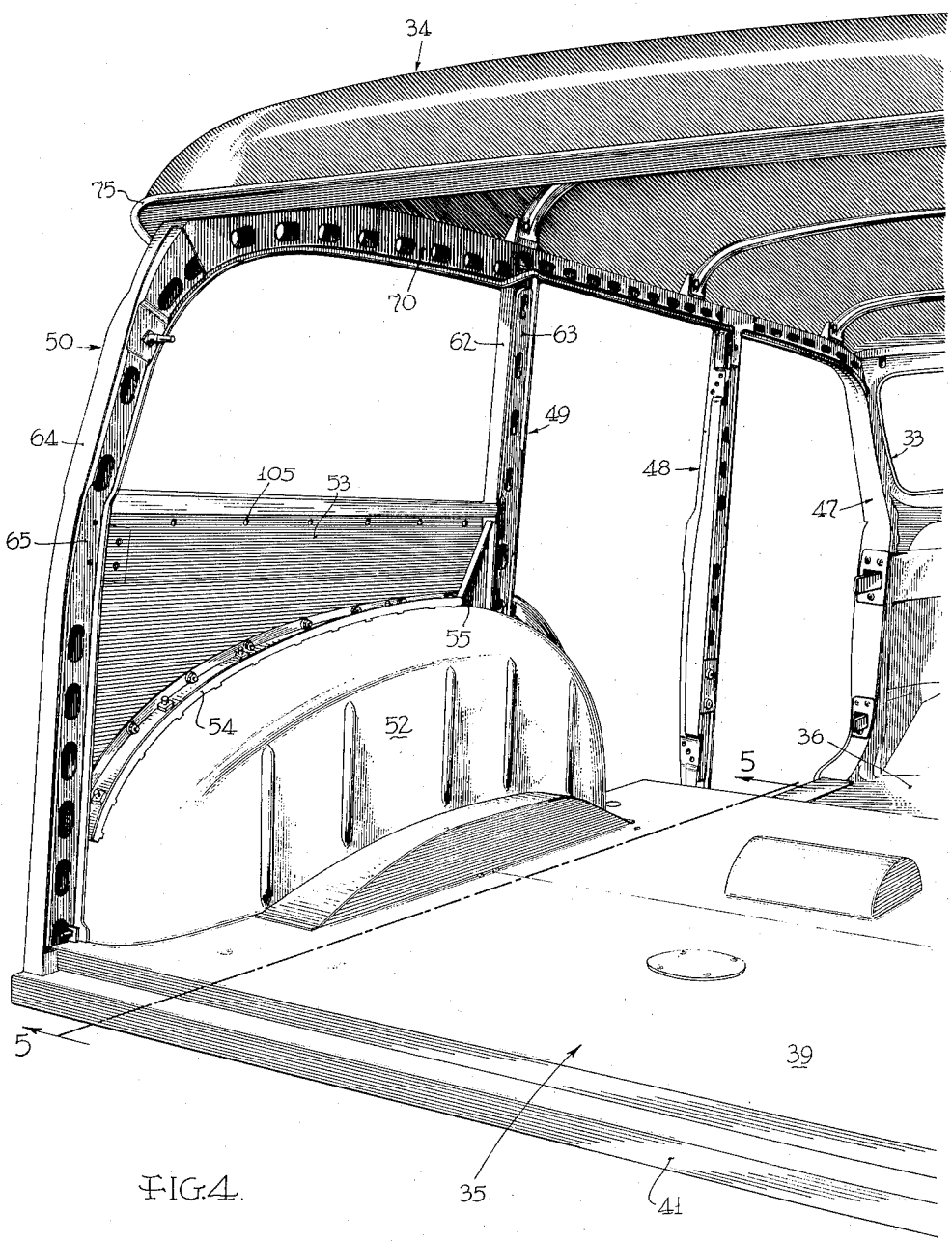

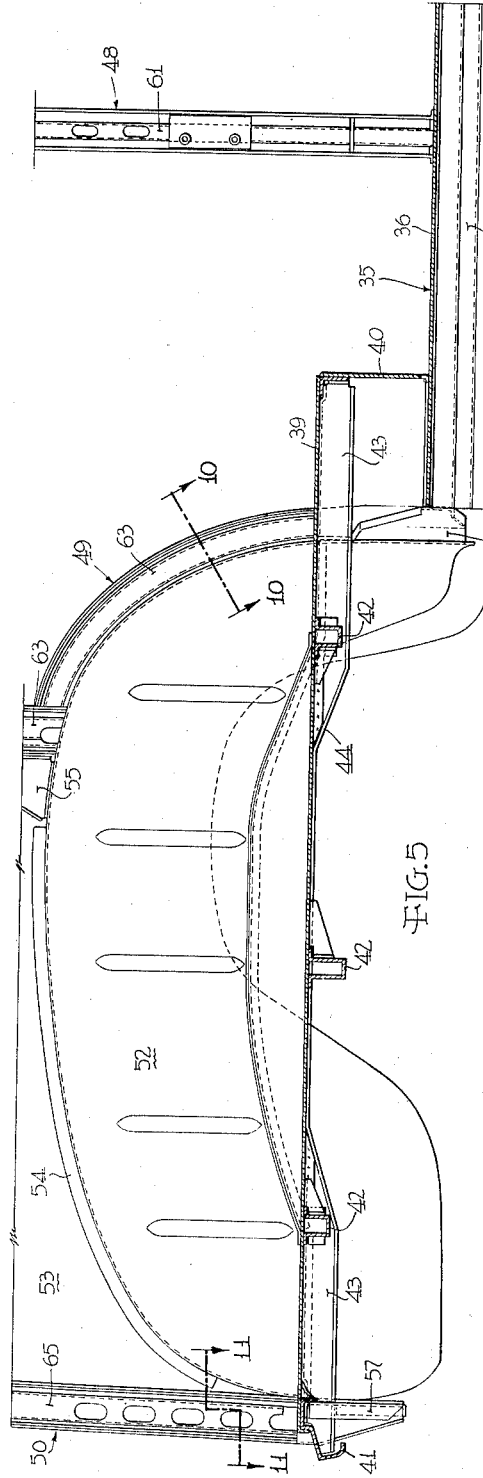

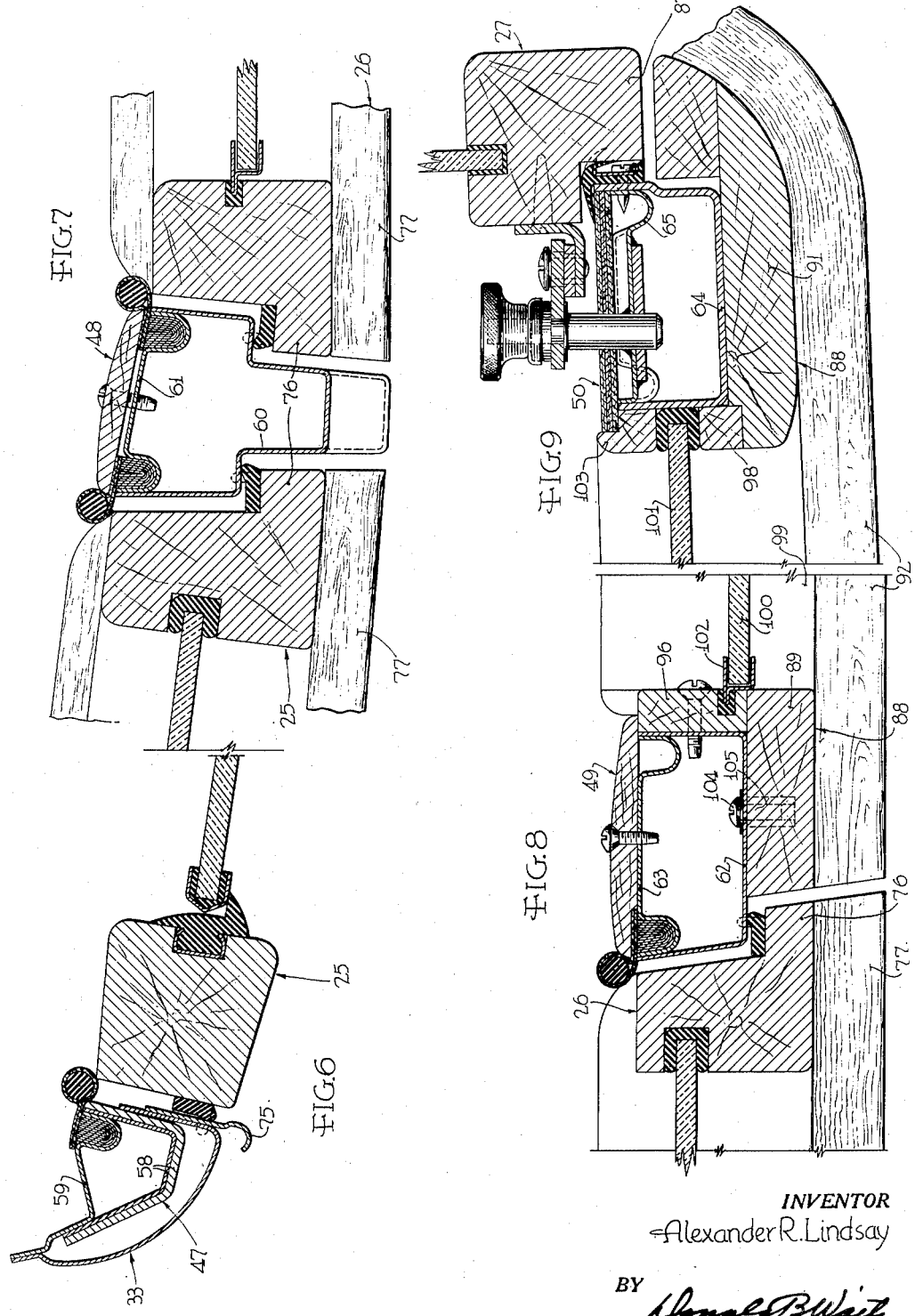

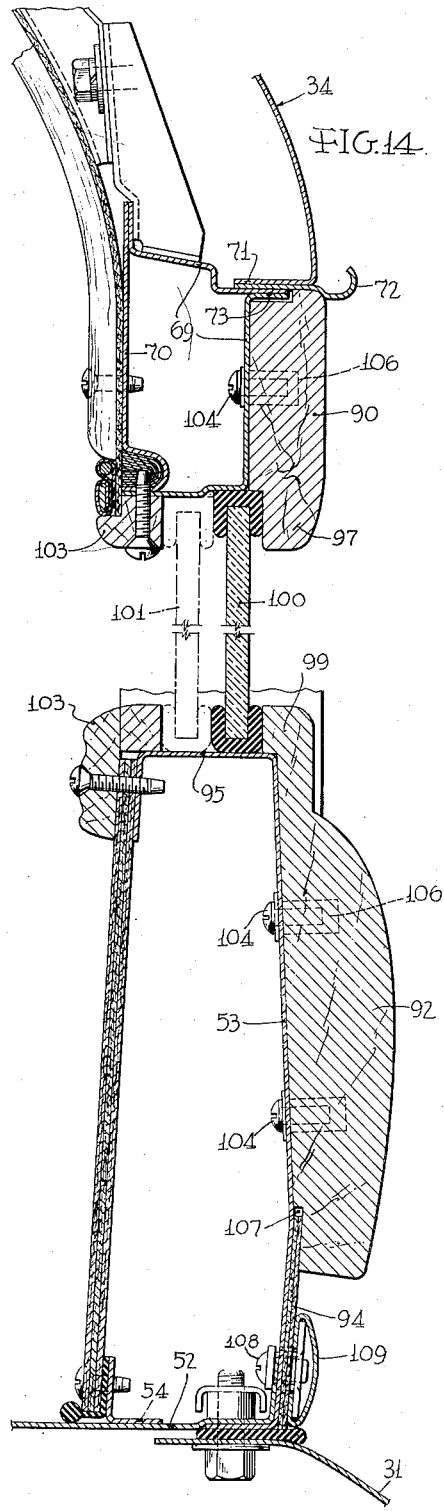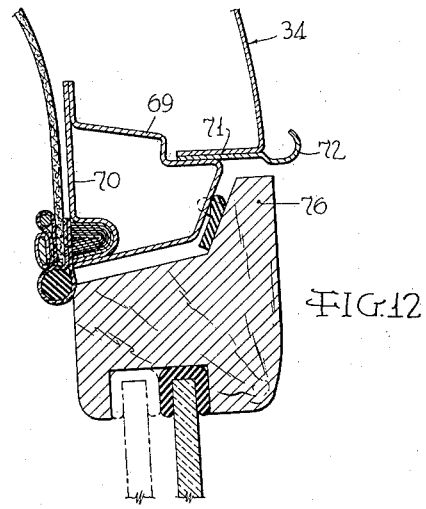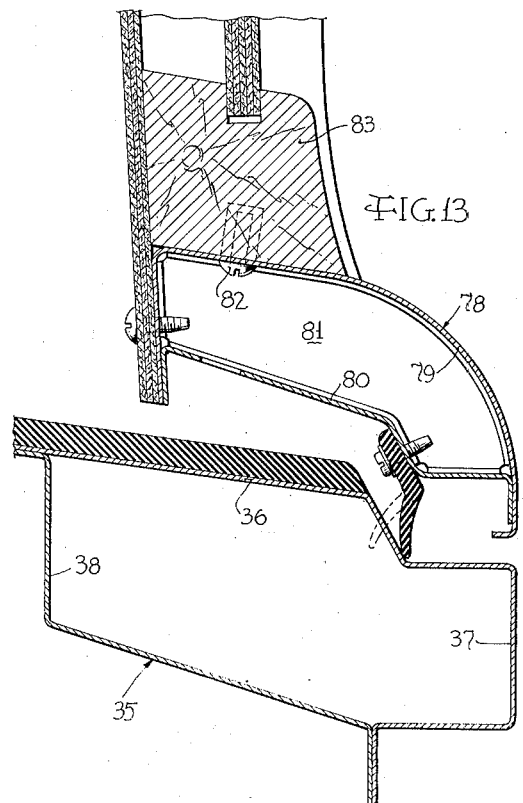

Jan. 29, 1952     A. R. LINDSAY     2,583,781
STATION WAGON OR THE LIKE
Filed Feb. 18, 1946     8 Sheets-Sheet 7
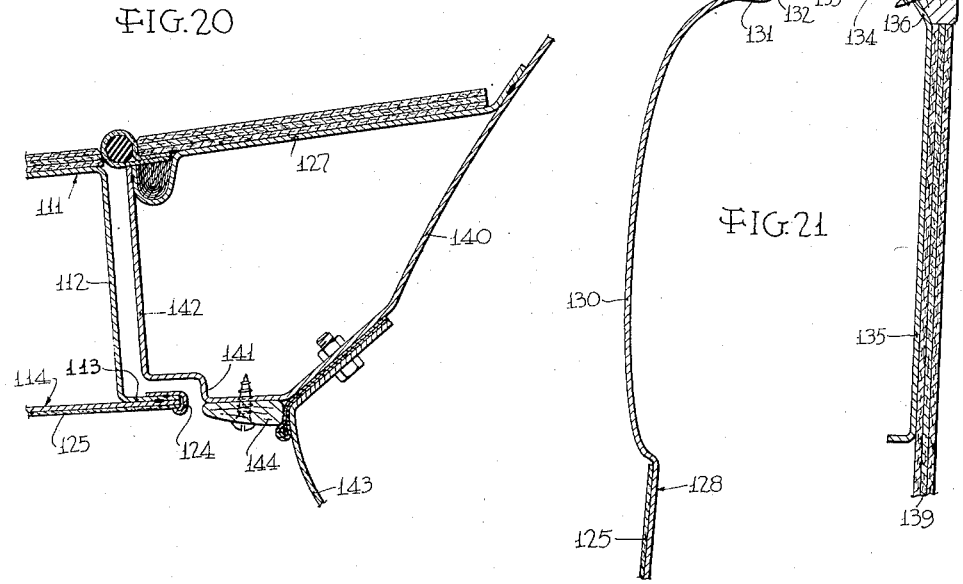
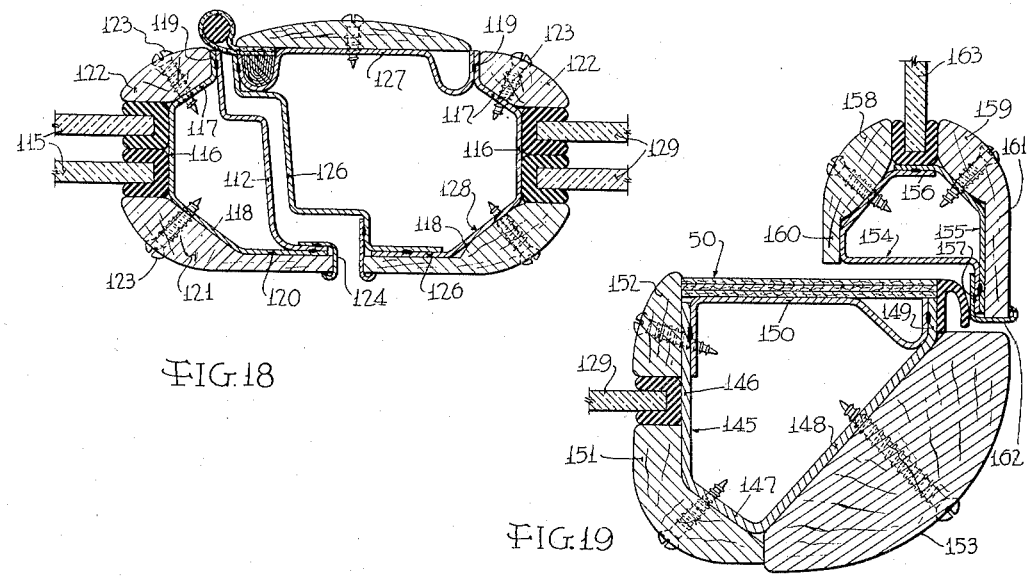
INVENTOR
Alexander R. Lindsay
BY
*Donald B. Waite*
ATTORNEY

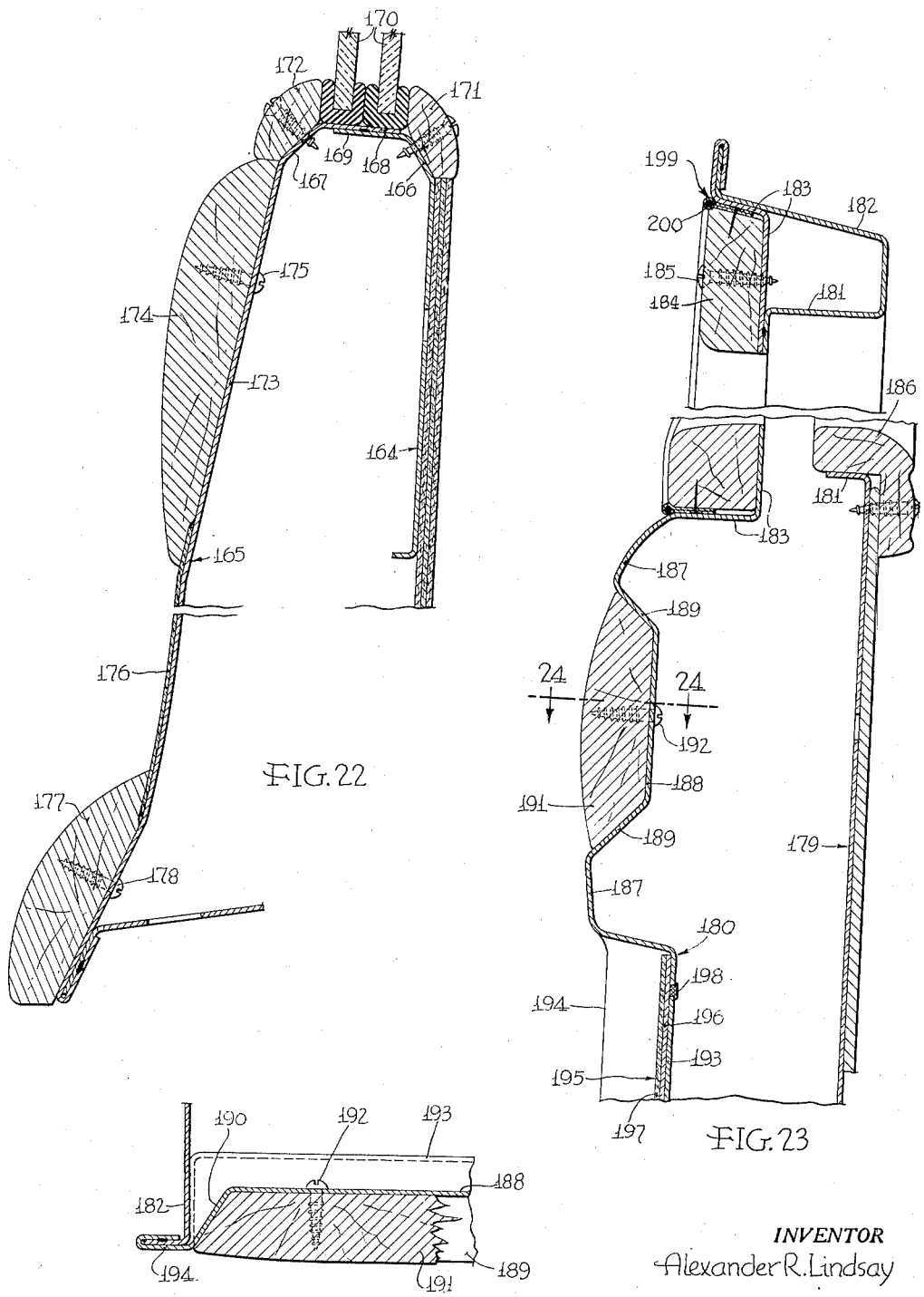

Patented Jan. 29, 1952

2,583,781

UNITED STATES PATENT OFFICE 2,583,781

STATION WAGON OR THE LIKE

Alexander R. Lindsay, Detroit, Mich., assignor to The Budd Company, Philadelphia, Pa., a corporation of Pennsylvania Application February 18, 1946, Serial No. 648,330

3 Claims. (Cl. 296—28)

The invention relates to automobiles of the type generally known as station wagons.

The bodies of such station wagons were hitherto made of wood, with the exception of a few parts, such as the windshield frame, the cowl, and the roof, which in some cases consisted of sheet metal stampings. It is obvious, and many serious accidents have proven, that the wood construction of the customary station wagons does not give adequate protection in the case of collision, at least it does not give protection which is in any measure comparable to the protection afforded by modern all-steel automobile bodies. Another objection is that the connections between the wooden elements become loose and result in rattling, poorly closing doors and windows and relatively short life of the body.

Attempts to make station wagons of all-steel construction so far have met with failure because the public seemingly wants the rustic appearance which the customary wooden station wagons afford.

The main object of the invention is to provide a station wagon construction which combines the advantages of the all-steel body construction with the appearance, or at least the essential parts of the appearance, of the customary wooden station wagons.

This object is, according to the invention, achieved by a construction comprising an inner sheet metal wall or supporting structure combined with outer wooden rails, panels and the like, and having the sheet metal structure and the wooden members complementarily shaped. In other words, the invention contemplates a composite wood-and-sheet-metal body which differs, among other things, from the composite passenger car bodies of former times in that the wood is on the outside and the steel on the inside.

The invention and its details as well as its objects and advantages will be more easily and fully understood from the embodiments illustrated in the attached drawing and described in the following:

In the drawing:

Figure 3 is a view corresponding to Figure 2 yet of a body stripped of doors, windows, and the wooden parts;

Figure 4 is a fragmentary view similar to Figure 3 yet on a larger scale and the view taken at a different angle so as to expose parts of the interior construction hidden from view in Figure 3;

Figure 5 is a fragmentary section and inside elevation of the side wall, the section being taken about along a vertical plane passing through line 5—5 of Figure 4;

Figure 6 to 9 are fragmentary horizontal sections on a larger scale through the body side wall, the sections being taken along the correspondingly numbered lines of Figure 2;

Figure 1:
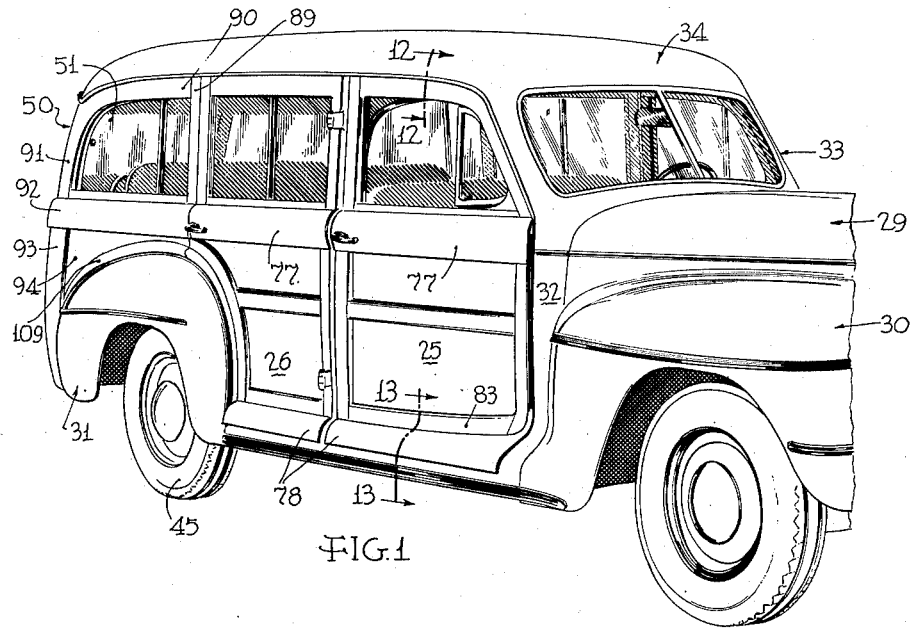
Figure 1 is a perspective front-and-side view of a station wagon built in accordance with the invention.
Figure 2:
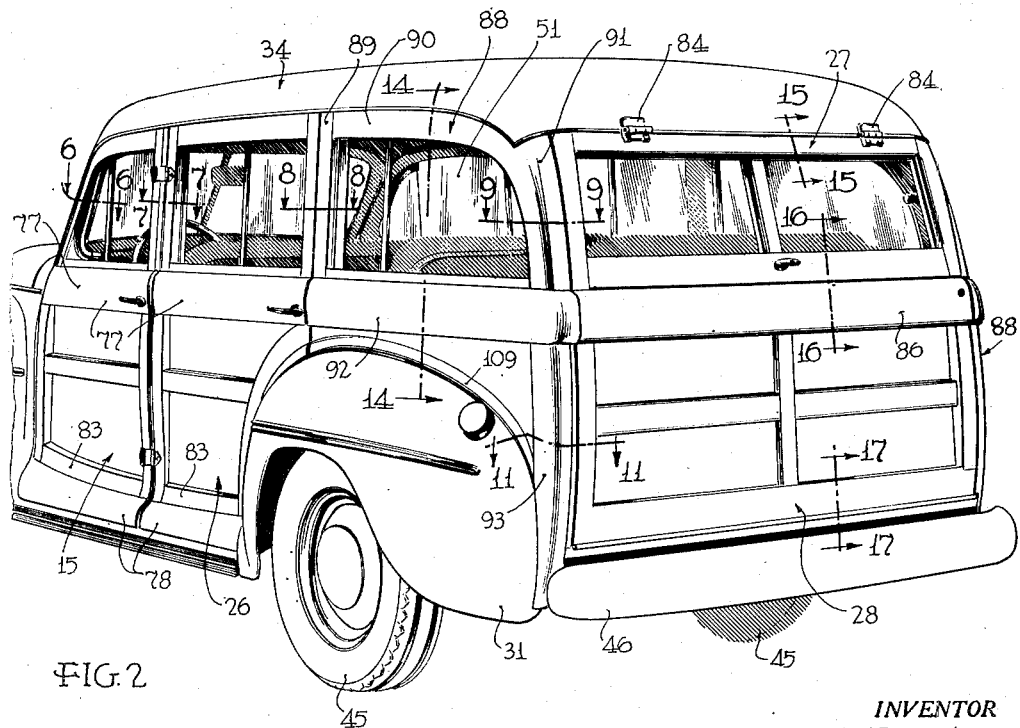
Figure 2 is a perspective side-and-rear view of the same station wagon.

Figures 10 and 11 are horizontal sections through the lower portions of the side walls along lines 10—10 and 11—11 of Figure 5;

Figures 12 to 14 and 15 to 17 are vertical fragmentary sections, respectively, through the side wall and door, and through the rear wall, the sections being taken along the correspondingly numbered lines of Figures 1 and 2;

Figures 18 to 21 are fragmentary sections through a modified construction, the sections corresponding, respectively, to Figures 8, 9, 11 and part of Figure 14;

Figures 22 and 23 are fragmentary vertical sections through doors illustrating two different further modifications of the invention; and Figure 24 is a fragmentary section along line 24—24 of Figure 23.

A look at the perspective Figures 1 and 2 shows that the outer appearance of the new station wagon is practically indistinguishable from the appearance of a customary wooden station wagon. Indeed, the side doors 25, 26 and the rear deck lids 27, 28 are substantially of customary all-wood construction, as illustrated in the sectional figures of the first embodiment. Moreover, the hood 29, fenders 30, 31, the cowl 32, the windshield frame 33, and the roof 34 are formed by sheet metal stampings which had likewise been used for all-wooden station wagons.

Contrary to customary station wagons, the stationary side wall portions connecting the underframe and floor structure, designated generally by the numeral 35, comprises an inner main supporting framework of metal and an outer wooden cover structure, as will presently be described in detail.

The foundation for the entire body is formed by the beforementioned floor and underframe structure 35 consisting entirely of sheet metal. This structure, see Figures 5 and 13, comprises a forward floor panel 36 extending from the cowl to about the front of the rear fenders 31 and provided with down-turned flange formations 37 along its longitudinal side margins, which flanges form, together with inner reinforcements 38, closed box-sectional side sills. The floor structure comprises, furthermore, a rearward floor section 39 which is connected with the forward floor section 36 by means of the heel board 40 from which it extends to the extreme rear transverse member 41. The forward floor panel 36 which is on a lower level than the rearward panel 39 may be reinforced in a customary manner by transverse braces, ribs and the like, some of which are not shown. The rear floor panel 39 is reinforced by inverted hat sections 42 and by longitudinal sill members 43 which are arranged at the ends below the floor panel extending in the middle region at 44 above the floor panel so as to make room for the rear axle and its accessories, both not shown, except for the rear wheels 45.

The understructure 35 may be secured to and supported by a chassis frame, which is not shown except for the rear bumper 46 attached thereto, in any appropriate or customary manner, or the understructure 35 may constitute part of a combined body and chassis structure.

Secured to and supported by the underframe structure are the front posts 47, the central posts 48, the rear door posts 49, and the rear corner posts 50. In the first embodiment, the first and second posts 47, 48 consist entirely of metal and their outer shape follows the contour of the adjoining door margins. The upper straight part of post 49 and post 50 is of comparatively shallow construction and does not extend outwardly to the outer surface as defined by the rear doors but their form is supplemented and completed by a wooden structure to be described later on.

Below the rear quarter window openings 51 the posts 49 and 50 are structurally interconnected on each side by a sheet metal wheel housing 52, by a sheet metal panel 53 which extends from the upper outer margin of the respective wheel housing to about the lower margin of the adjacent window opening 51, and by reinforcing rails and brackets 54, 55 attached respectively to the wheel housing 52 and the panel 53. The lower ends of the posts 49 and 50 are connected with the floor structure 35 by brackets 56, 57, respectively.

Each of the posts 47 to 50 comprises an outer inwardly facing channel section or sections and an inner channel section member marked respectively 58, 59; 60, 61; 62, 63; and 64, 65. The lower curved portion of post 49, the so-called dog leg, follows the front margin of the wheel housing and fender and is in part formed by the former, as shown in Figure 10. The wheel housing 52 is secured by longitudinally extending flanges 66, 67 and the panel 53 by similar flanges, such as 68 (Figure 3), to the outer walls of the post members 63 and 64.

The upper ends of the posts are interconnected on each side by a box-sectional header rail comprising an outer channel-section member 69 and an inner member 70. This header 69, 70 consists in effect of and merges at its ends into the upper ends of the front and rear posts 47 and 50 respectively. Secured to the header is the roof 34 by an inwardly directed flange 71 and a drip channel 72. It should be noted that these marginal structures extend outwardly beyond the header 69, 70 so as to make room for the outer wooden structure to be described later on. Note also that between the rearward posts 49, 50 the member 69 comprises two members which are overlappingly secured by their marginal portions or flanges 73 which latter also serve for the attachment of the roof flange 71 and the drip channel 72 (see Figure 14).

A similar transverse header 74 interconnects the rear corner posts 50 and is secured to the rear margin of the roof 34 and the transverse drip channel 75.

The entire structure so far described is of sheet metal and is reinforced at appropriate places by brackets or other reinforcements which likewise consist preferably of sheet metal but may also be formed by forgings or castings. Indeed, the supporting structure so far described, which is clearly shown in Figures 3 to 5 and in the cross sectional Figures 6 through 15 and 17, presents a structure which in regard to its strength and its ability to take up severe shocks in case of collision, overturning, rolling down a slope, etc., is on a par with all-steel private car bodies as they have now been in practically exclusive use for many years.

While it would be desirable, and is shown in the second embodiment, to use the same construction for the doors, it will sometimes be found that the expense for the dies for making the doors of sheet metal is too high, considering the fact that each of the doors is of different shape and that the production numbers for station wagons are extremely small as compared with the production numbers for any popular type of private passenger car. For this reason, it may be found advisable to employ wooden doors which may be substantially identical with the doors hitherto used on station wagons. Such doors are illustrated for the first embodiment (Figures 1 to 17). However, the side doors, as shown in Figures 1, 2, 12 and 13, have one remarkable new feature (described later on) which not only increases the strength but also reduces materially the manufacturing cost.

The side doors 25, 26 of the first embodiment have their vertical and their upper transverse wooden frame members provided with outer laterally extending portions 76 which nest into rabbets formed in the outer members of the post 48, in the lower portion of the post 49, and formed by the portions of roof 34 and drip channel 72 projecting outwardly beyond the header member 69. The outer surface of the doors is substantially flush with the adjoining portions of the outer surfaces of the posts 47, 48 and of the roof 34. Yet at the front post 47 the door rail has no projection and the front post no rabbet, although the flange and rabbet construction might also be used along this post.

Along the belt line the side doors 25, 26 have a heavy wooden molding rail 77 and along the bottom they are provided with a sill member 78 overlying the threshold formed by the outer portion of the floor structure. This outwardly extending sill 78 was customarily made of wood and was very expensive because it required a large piece of solid lumber. According to the present invention, this rail 78 is made for each door of an outer sheet metal member 79 and an inner sheet metal member 80 which are overlappingly secured together so as to form a box-sectional sill and the open ends of which may be closed by end pieces 81, see Figure 13. The sill 78 is secured by screws 82, accessible through holes in the member 80, to the lower horizontal wooden frame member 83 of the respective door.

The wooden rear wall lids or tail gates 27, 28 are hinged at 84 and 85, respectively, to the roof 34 and the transverse bottom rail 41. The tail gate 28 is provided along its upper margin with a belt rail 86 of similar cross section as the corresponding belt rail molding 77 of the side doors. The vertical side rails of the rear wall doors or lids have outwardly projecting portions 87 which in closed position rest against the rear inner corners of the rear posts 50 (Figures 9 and 11).

The exterior of the body is now completely described, with the exception of the vital region defined on each side by the upper margin of the rear fender 31, the posts 49, 50 and the lateral margin of the roof.

In the last-named region, the steel construction of the body is covered by and combined with a wood construction designated as a whole by the numeral 88 and consisting mainly of a forward post member 89, a header member 90, an upper rear corner post member 91, a belt rail member 92, a lower rear corner post member 93, and a panel member 94 between the posts, the belt rail and the fender. These wooden members may be preassembled into one or several units which as a whole may be secured to or taken off the steel construction. The details of the wooden structure and its connection to the steel construction will now be described.

The belt rail member 92 forms a continuation of and a connecting link between the belt rail members 77 and 86 of the side doors 26 and the tail gate 28, respectively. This member 92, together with the upper post members 89, 91 and the header member 90, completely surround the rear quarter window opening 51 and extend toward the center of the opening beyond the confines of the steel framework constituted by the posts 49, 50, the header member 69, and the inwardly directed flange 95 of the lower rear quarter side panel 53. These projecting portions 96, 97, 98 and 99 of the respective wooden rails surrounding the window opening form part of the channels for guiding the horizontally slidable two-piece window 100, 101. While member 96 of the forward post 49 is formed as sole reception means for the reinforcement 102 of the slidable window 100, the channels along the remaining margins of the window are completed by the metal structure forming the bottom wall of the channel and by wooden inner garnish moldings 103 which are removably secured to the metal structure.

The described wooden framework is throughout intimately connected with and securely fastened to the metal structure by screws 104 passing from the inside through the outer walls of the metal structure into metal dowels 105 or plugs 106 firmly pressed into borings of the wooden frame members. The panel 94 is held in recesses 107 along the lower inner margin of the belt rail 92 and the lower rear corner post member 93 and is additionally secured to the metal structure along the wheel housing contour by means of bolts and nuts 108, together with a molding strip 109 held by the heads of the bolts. Where the molding strip reaches the dog-leg portion of the rear door, it is continued by a molding 110 which constitutes one arm of an angle-section rail, the other arm of which is screwed to the frame of the door 26. This molding 110 constitutes in its region a door overlap flange.

The panel 94 may consist of plywood or of veneer adhesively secured to a sheet metal panel or of any other appropriate material.

The interior trim panels and wooden frame moldings as well as their securing means are illustrated in the drawing but are believed not to require description in detail. The same is true for such items as the floor covering, locks, hinges, the weather strips for doors and windows, and the securing means for the fenders.

In the preceding description frequently the singular has been used for parts which appear in the construction two or more times, such as the side doors, the posts, and the wooden cover members on both sides, etc. Also, the drawing shows in many instances only one side or only a section through one of such members as doors. It is, however, self-evident which parts are of similar or identical construction.

The embodiment illustrated in Figures 18 through 21 differs from the first embodiment in the further reduction of the amount of wood entering into the body. Indeed, the entire body, including the doors, is practically an all-steel construction except for wooden moldings surrounding the window openings and for veneer panels arranged below the belt rail.

The doors of this embodiment comprise an inner panel 111 provided with a transverse marginal web 112 and an outer lateral flange 113, and an outer panel 114 overlappingly secured to the flange 113. Around the opening for the windows 115 the outer panel 114 presents a laterally open channel having a bottom wall 116, diverging side walls 117, 118, an inwardly directed flange 119 on wall 117, and a lateral extension 120 of the wall 118. The channel 116 to 120 is fastened mouth-down to the rail or web portion 112 so as to constitute a closed box-sectional door rail. This construction may extend along the vertical sides and the upper horizontal side of the window opening.

The channel wall 116 constitutes also the bottom wall of the guide channel for the windows 115 whereas the outer side wall of the channel is constituted by wooden rails or a wooden frame 121 which overlaps completely the outside of the rail portions 118, 120. Similarly, the inner walls of the window guide channel are formed by wooden rails 122 overlappingly secured to the walls 117, 119 of the metal framework. The rails 121, 122 are secured by screws 123, and the outer wooden rails 121 are additionally held and reinforced along their outer margins by narrow molding strips 124 which are secured, such as by welding or screws, to the flange 113.

Below the belt line, the door is completely or in part covered by a panel 125 of wood or a material giving the same or similar appearance as wood, such panel again being held by molding strips 124'.

In regard to the formation of the metal door structure below and of the wooden rails along the lower margin of the window, reference is had to the similar construction of the rear quarter section as shown in Figure 21 and described later on.

The post adjoining the door consists of a jamb-face member 126, an inner panel member 127, and an outer member 128. The outer member 128 is provided in the region of the opening for the rear quarter side windows 129 with a channel-section rail which is similar to the door rail 116 to 120 so that corresponding portions thereof are marked with the same numerals. Also, the wooden members constituting the inner and outer walls of the window guide channels are practically identical with the wooden members 121, 122 of the door and, therefore, designated by the same numerals.

Along the lower horizontal margin of the window opening, the outer panel 128 is outwardly beaded at 130 so as to constitute a belt rail. This belt rail portion 130 has an inwardly directed offset 131, an inwardly and upwardly directed flange 132, and a substantially horizontal inwardly directed flange 133, which latter is overlappingly secured to an outwardly directed flange 134 of the inner rear quarter panel 135. Between the flange 134 and the main portion of panel 135 is an inclined portion 136. Obviously, the members 132, 133 and 136 form a continuation of the rail portions 116, 117, 118 and serve for the securement of outer and inner wooden moldings 137, 138 which form continuations of the moldings 121, 122. Note that the outer molding 137 nests into the angle formed by the flange portions 131, 132 while the inner rail member 138 fits against the inclined portion 136 and abuts the upper margin of the inner trim panel 139.

Below the belt rail portion 130, the panel 128 is covered by a panel 125 which corresponds to the panel of the door designated by the same numeral. In the lower portion of the body, the wheel housing 140 is formed integrally with the door post portions 141, 142 and secured to the inner sheet metal panel 127. Along the connecting line between the wheel housing 140 and the fender 143, a wooden molding strip 144 is provided.

The door is preferably provided, as indicated before, with a sheet metal beading corresponding to the beading 130 of the rear quarter panel and formed along the lower margin of the window openings corresponding to the parts 130 to 138.

The rear corner post (Figure 19) comprises a heavy gauge channel-section member 145 having a front wall 146 adjoined by a rearwardly and outwardly inclined bottom wall portion 147, a rearwardly and inwardly inclined bottom and rear wall portion 148, and a narrow transverse flange 149 adjoining the portion 148. The mouth of the member 145 is closed by an inner panel strip 150. The wall 146 constitutes the bottom wall of the guide channel for the rear margin of window 129. The wall portion 147 corresponds to the wall portion 118 at the forward post and is covered by a wooden molding strip 151 corresponding to the strip 121 and constituting the outer wall of the window guide channel. The inner wall of the window guide channel is formed by an inner wooden molding strip 152. Also in this embodiment, the wooden strips 121, 137 and 151 on the outside and/or the wooden strips 122, 138 and 152 on the inside may constitute, together with the respective wooden strip or rail (not shown) along the upper margin of the window, a frame adapted for insertion and removal as a unit.

The rearwardly and outwardly facing portion 148 of the corner post is covered by another heavier wooden rail 153.

The upper portion of the tail gate, as shown in Figure 19, is similar in construction to the side door shown in Figure 18. This tail gate has a frame member 154 presenting a rearwardly facing channel and a generally angle-section outer sheet metal member 155. The two members are connected with each other, such as by electric spot welding, by their overlapping marginal portions at 156 and 157. The inside and the outside are covered by wooden rails 158 and 159 respectively. Note that the inner wooden rail 158 has a lateral extension 160 similar to the lateral extension 161 of the outer wooden member 159. The lateral margin of the member 159 and its extension 161 are covered by a molding or retaining strip 162 corresponding to the strips 124, 124' of the doors in side walls. As in the case of the side door window and the rear quarter window, the retaining channel for the window 163 is formed by the metal door frame 154, 155 and the wooden rails 158, 159.

The modified construction illustrated in Figure 22 as applied to a side door is, of course, also applicable to the construction of the stationary wall portions. Indeed, throughout, the constructional details, especially around the window openings, are applicable either to the doors or to the permanent walls or to both. Merely for the sake of simplicity and the avoidance of repetitions, the constructions are, for the most part, not shown for both fields of application, so that expressions such as "wall structure" in the subsequent claims should be understood to include a stationary part of the body as well as a door, unless expressly otherwise indicated.

The door illustrated in Figure 22 has an inner panel 164 and an outer panel 165. Around the window opening, the two panels have portions 166, 167, respectively, which are inclined toward each other and the center of the opening and are continued by transverse flanges 168, 169, respectively, which are overlappingly secured to each other, such as by electric spot welding, and constitute the bottom wall for the guide channel of the windows 170. The inclined portions carry the wooden rails or frames 171, 172, respectively, which in turn form the inner and outer walls of the window guide channel. So far, the construction is practically identical with the construction illustrated in Figure 21. At the belt line, however, the outer panel 165 has a substantially plane portion 173 which supports a wooden belt rail 174 secured in place by screws 175. The wooden rail 174 overlaps the upper margin of a panel 176, such as of plywood. The lower margin of the panel 176 is held and covered by a second wooden rail 177 arranged at the lower margin of the door and held by screws 178. This rail 177 gives the margin of the door a construction and an appearance similar to the appearance of the lower edge of the door illustrated in Figure 13 yet with the difference that in this case the lower rail is of wood.

Figures 23 and 24 represent a door construction of a still further modified form of the invention. Here too, it should be understood that the illustrated principles may be employed not only for the door but for other wall portions, such as the rear quarter panel including the rear quarter window.

The door illustrated in Figures 23 and 24 comprises an inner panel 179 and an outer panel 180. The inner panel is flanged in its upper portion at 181 and along its outer margins at 182 so as to constitute, respectively, a frame for the vertically sliding window (not shown) and the jamb faces of the door. The outer panel 180 is provided with an angle-section flange 183 around the window opening so as to receive wooden molding rails or a wooden frame unit 184 held by screws 185. On the inside, the door is provided around the window opening with a window retainer frame 186 which is only shown for the lower margin of the window opening.

An outwardly projecting belt molding or beading 187 formed as part of panel 180 extends across the door below the window opening. This molding is similar to the molding or bead 130 in Figure 21 with the difference that it is provided with a central trough-shaped recess having a bottom wall 188 and inclined side walls 189, and an inclined end wall 190 adjoining the jamb rails 182. This shallow trough is filled with a wooden rail 191 held by screws 192. Below the belt rail portion 189, the main portion of the panel 180 is inwardly recessed at 193 with respect to the marginal surface portions 194 as represented by the door overlap flanges designated by the same numeral. The recessed portion 193 is covered with a composite panel 195 comprising a metal supporting panel 196 and an outer wood panel 197 adhesively attached to the metal panel. This composite structure 195 is easily removably attached to the panel portion 193 such as by points of solder 198 extending through holes in the panel 193 and adhering to the inside of the panel 196. Other means may be used, of course, for removably securing the wood-covered metal panel to the metal supporting structure, such as for instance, spring clips or bolts secured to the metal panel, extending through holes in the metal structure and provided with nuts.

The last described combined wood-and-metal panel may be used also for the other embodiments hereinbefore described. On the other hand, for the last described embodiment as well as for the other embodiments, wood veneer or wood panels may be employed which are adhesively attached to the supporting structure.

In the embodiment illustrated in Figures 23 and 24, the wood rails 184 may be surrounded on their outer margins by a metal welting strip 199 having a circular cross sectional outer portion 200 which covers the connection between the wood and the adjoining metal structure. This strip may consist of thin metal folded back upon itself and having the cylindrical portion filled with cordage or the like. This strip may be nailed to the wooden rails or frame prior to the assembly of the metal structure, and it may be plated and polished so as to contribute to the appearance of the body.

The invention is susceptible to modifications, particularly so as to adapt it to different types, styles of bodies and to the region of the body to which it is applied.

What is claimed is:

1. In an automobile body of the station wagon type, an outer upright side wall metal body member having a substantial area thereof intermediate the side and bottom marginal edges thereof depressed inwardly to provide a recessed area provided with a solid bottom panel offset inwardly of the outer portions of said panel which are disposed laterally of said recessed area, strips of wood or the like mounted outwardly of said bottom along the edges of said recessed area and having a thickness greater than the depth of said recessed area and also having sections of less thickness extending laterally across said edges of the recessed area and of a width to substantially cover said outer portions of the panel.

2. In a vehicle having a window opening, a pressed metal panel structure extending around said opening continuously to at least three edges of the panel, said panel structure being depressed to provide a recessed area provided with a solid bottom panel disposed inwardly of the normal exterior contour of the panel structure and leaving marginal portions of the panel structure extending continuously around at least three sides of said area disposed outwardly of the bottom of said area, a framing structure of wood or the like comprising edge strips extending along the edges of said area and spaced transverse strips connecting a pair of opposed edge strips, said strips being of greater thickness than the depth of said recessed area and said panel structure being exposed between the strips, said edge strips having portions of reduced thickness extending laterally of said recessed area over said marginal portions of the panel structure.

3. In a vehicle body of the station wagon type, a pressed metal outer body member having an inwardly depressed portion provided with a continuous bottom panel offset inwardly of portions of the panel adjoining said depressed portion, a wood veneer frame having a relatively thick section mounted outwardly of said bottom within said depressed portion with the edge thereof exposed, said frame having a relatively thin section projecting laterally to overlie an adjoining portion of the body panel beyond said depressed portion and having its edge terminating substantially at an outer edge of the body panel.

ALEXANDER R. LINDSAY.

REFERENCES CITED

The following references are of record in the file of this patent:

UNITED STATES PATENTS

| Number | Name | Date |
| --- | --- | --- |
| Re. 14,349 | Burnett | Sept. 11, 1917 |
| D. 112,647 | Russo | Dec. 20, 1938 |
| D. 139,455 | Walker | Nov. 14, 1944 |
| 496,663 | Miller | May 2, 1893 |
| 753,315 | Romunder | Mar. 1, 1904 |
| 1,307,044 | Friedrich | June 17, 1919 |
| 1,641,319 | Childs | Sept. 6, 1927 |
| 1,643,742 | Ledwinka | Sept. 27, 1927 |
| 1,674,394 | Hansen | June 19, 1928 |
| 1,956,616 | Holtom | May 1, 1934 |
| 2,151,229 | Piroumoff et al. | Mar. 21, 1939 |
| 2,171,381 | Werner | Aug. 29, 1939 |
| 2,255,880 | Gregorie | Sept. 16, 1941 |
| 2,433,169 | Stephenson et al. | Dec. 23, 1947 |
| 2,474,991 | Stephenson et al. | July 5, 1949 |

FOREIGN PATENTS

| Number | Country | Date |
| --- | --- | --- |
| 208,585 | Great Britain | Dec. 18, 1923 |
| 312,959 | Great Britain | June 4, 1929 |
| 314,685 | Great Britain | July 4, 1929 |
| 720,167 | France | Dec. 3, 1931 |

OTHER REFERENCES

Bohn Aluminum and Brass Corp., Adv. page 91, S. A. E. Journal, March 1944.